(12) United States Patent
Prakash et al.

(10) Patent No.: US 6,876,771 B2
(45) Date of Patent: Apr. 5, 2005

(54) EFFICIENTLY ADAPTIVE DOUBLE PYRAMIDAL CODING

(75) Inventors: Adityo Prakash, Redwood Shores, CA (US); Edward Ratner, Sunnyvale, CA (US)

(73) Assignee: PTS Corporation, San Jose, CA (US)

(*) Notice: Subject to any disclaimer, the term of this patent is extended or adjusted under 35 U.S.C. 154(b) by 652 days.

(21) Appl. No.: 10/028,998

(22) Filed: Dec. 20, 2001

(65) Prior Publication Data

US 2002/0076114 A1 Jun. 20, 2002

Related U.S. Application Data

(60) Provisional application No. 60/257,845, filed on Dec. 20, 2000.

(51) Int. Cl.$^7$ ............................................. G06K 9/36
(52) U.S. Cl. ................. 382/239; 382/243; 382/236; 382/239; 375/240.13
(58) Field of Search ............................. 382/240, 243, 382/236, 238–239, 244, 250, 251–253, 248, 162, 166–167; 358/426.02–42; 348/400.1–421.1; 341/51, 79; 375/240.1, 240.03, 240.11–24.13, 240.16, 240.18, 240.19, 240.24

(56) References Cited

U.S. PATENT DOCUMENTS

| | | | |
|---|---|---|---|
| 5,706,220 A | | 1/1998 | Vafai et al. |
| 6,434,196 B1 | * | 8/2002 | Sethuraman et al. ... 375/240.12 |
| 2002/0131494 A1 | * | 9/2002 | Fukuda et al. ......... 375/240.03 |

FOREIGN PATENT DOCUMENTS

| | | |
|---|---|---|
| EP | 0 921 685 A1 | 9/1999 |
| WO | WO 00/64167 A1 | 10/2000 |
| WO | WO 00/77735 A1 | 12/2000 |

OTHER PUBLICATIONS

PCT International Search Report; 3 pages; mailed Jan. 1, 2003.

Jens–Rainer Ohm, et al. "Digitale Bildcodierung" 1995, pp. 428–432, XP–002227549, New York.

* cited by examiner

*Primary Examiner*—Kanjibhai Patel
*Assistant Examiner*—Ali Bayat
(74) *Attorney, Agent, or Firm*—Okamoto & Benedicto LLP

(57) ABSTRACT

In accordance with an embodiment, a method of encoding includes generating for each transform point a double difference coefficient (comprising the difference between a modeled difference coefficient and a raw difference coefficient) and encoding as an adaptive difference coefficient for each transform point either the double difference coefficient or the raw difference coefficient. Whether the double difference coefficient or the raw difference coefficient is selected to be the adaptive difference coefficient depends on which one provides more efficient coding. A method of decoding includes receiving the adaptive difference coefficients from the encoder, applying the same modeling and transform as the encoder to generate the modeled difference coefficients, generating corrective difference coefficients (from the adaptive difference coefficients and the modeled coefficients), and inverse transformation using the corrective difference coefficients. A system may include an encoder implementing the method of encoding and a decoder implementing the method of decoding.

13 Claims, 18 Drawing Sheets

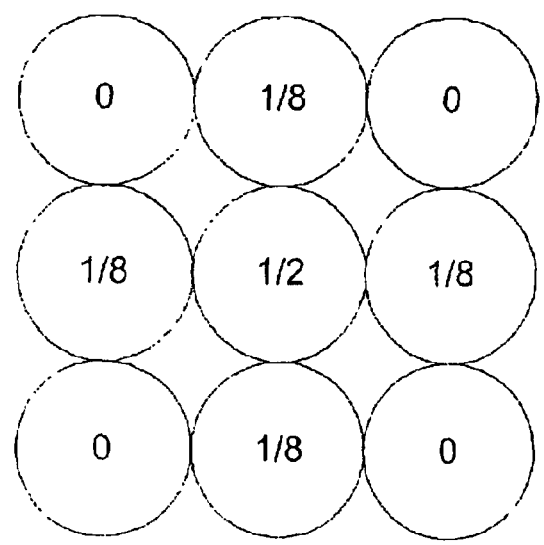
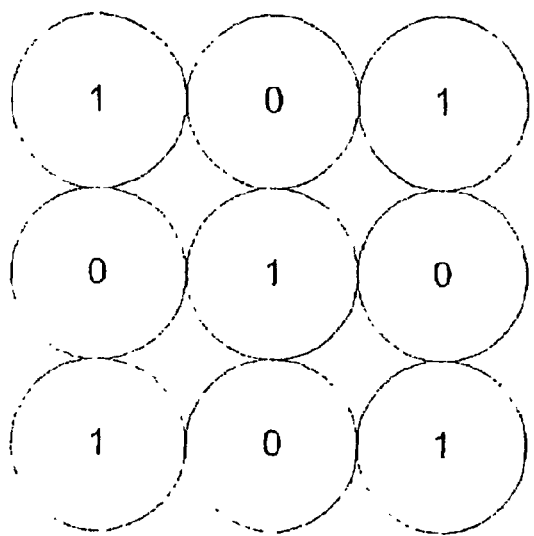
FIG. 2E

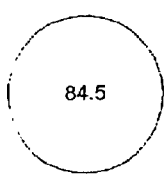 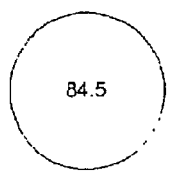 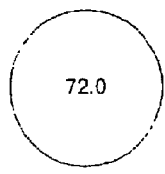 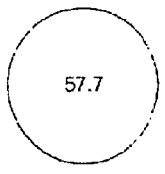
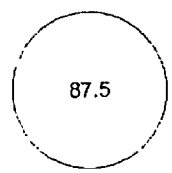 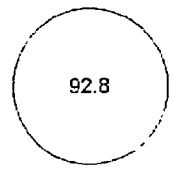 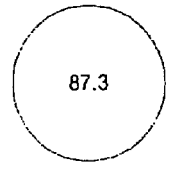 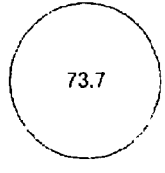
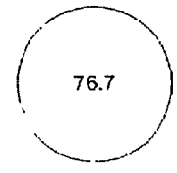 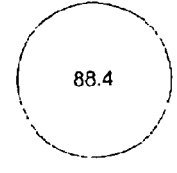 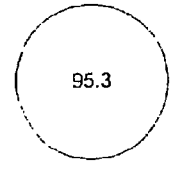 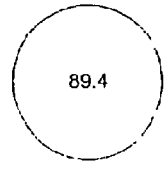
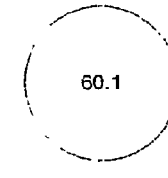 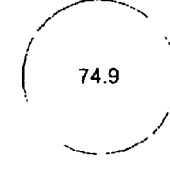 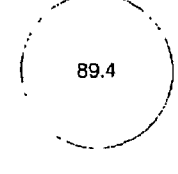 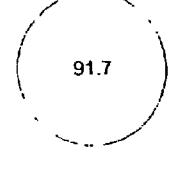
FIG. 2G

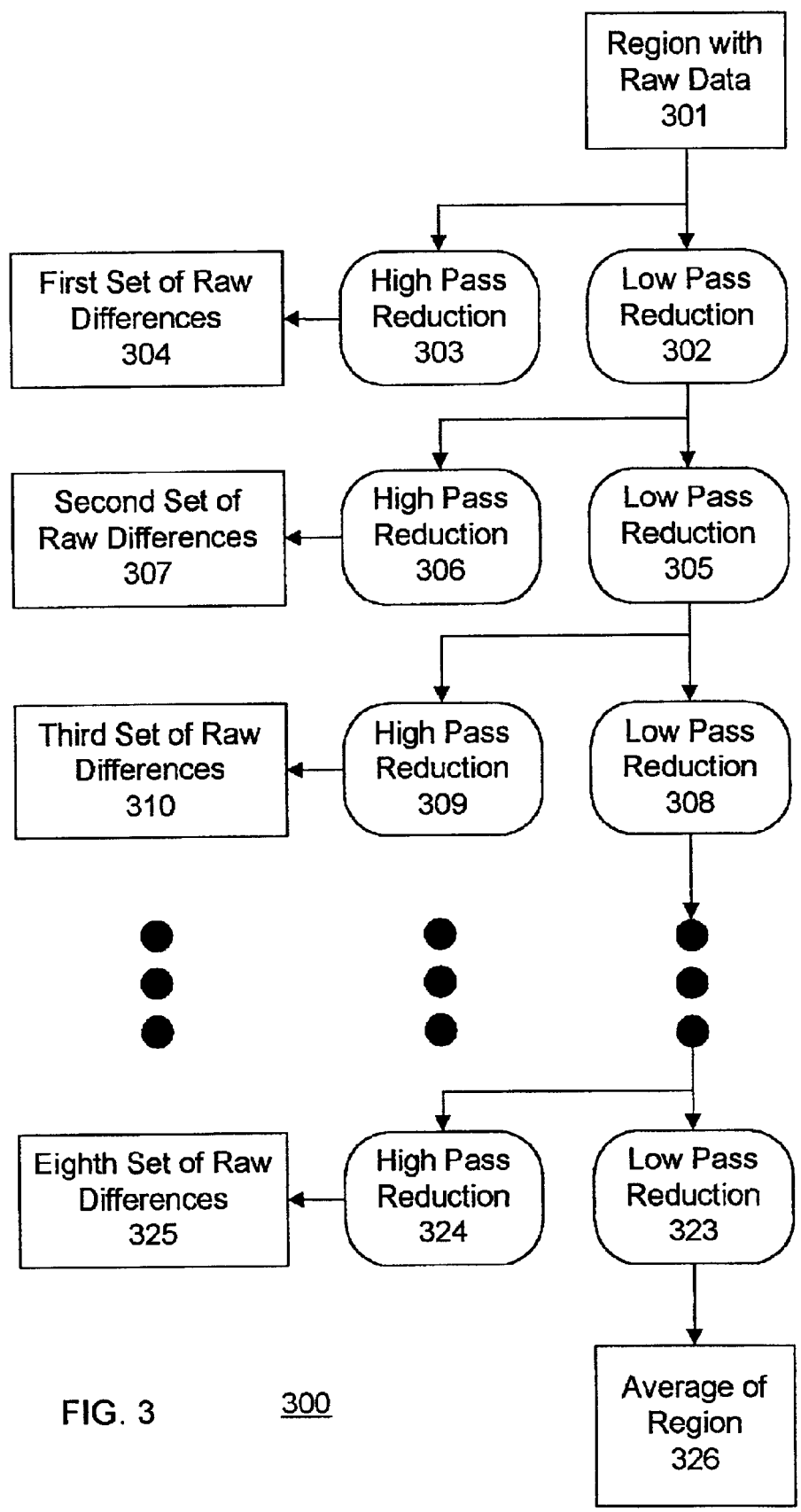
FIG. 3    300

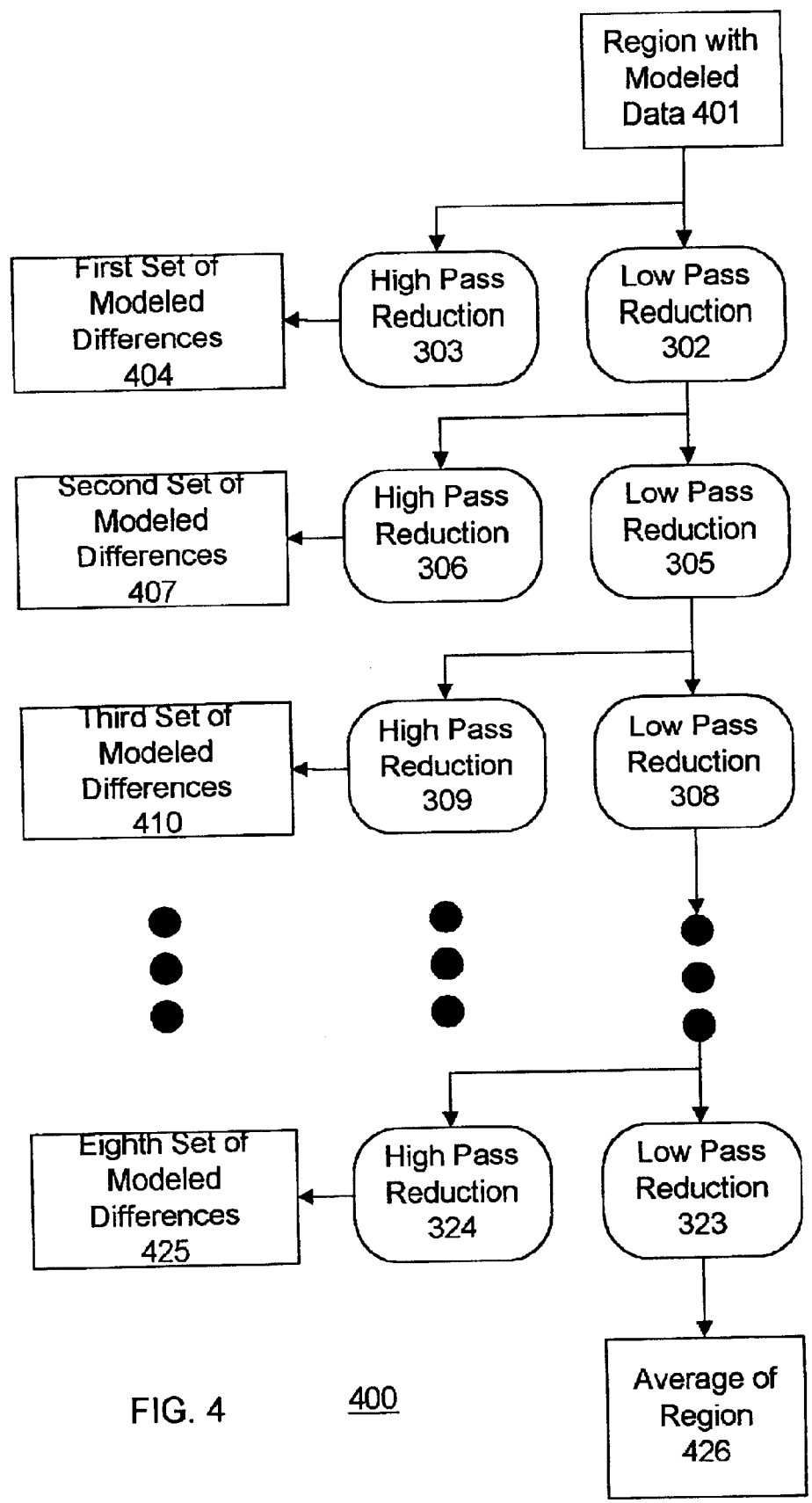
FIG. 4     400

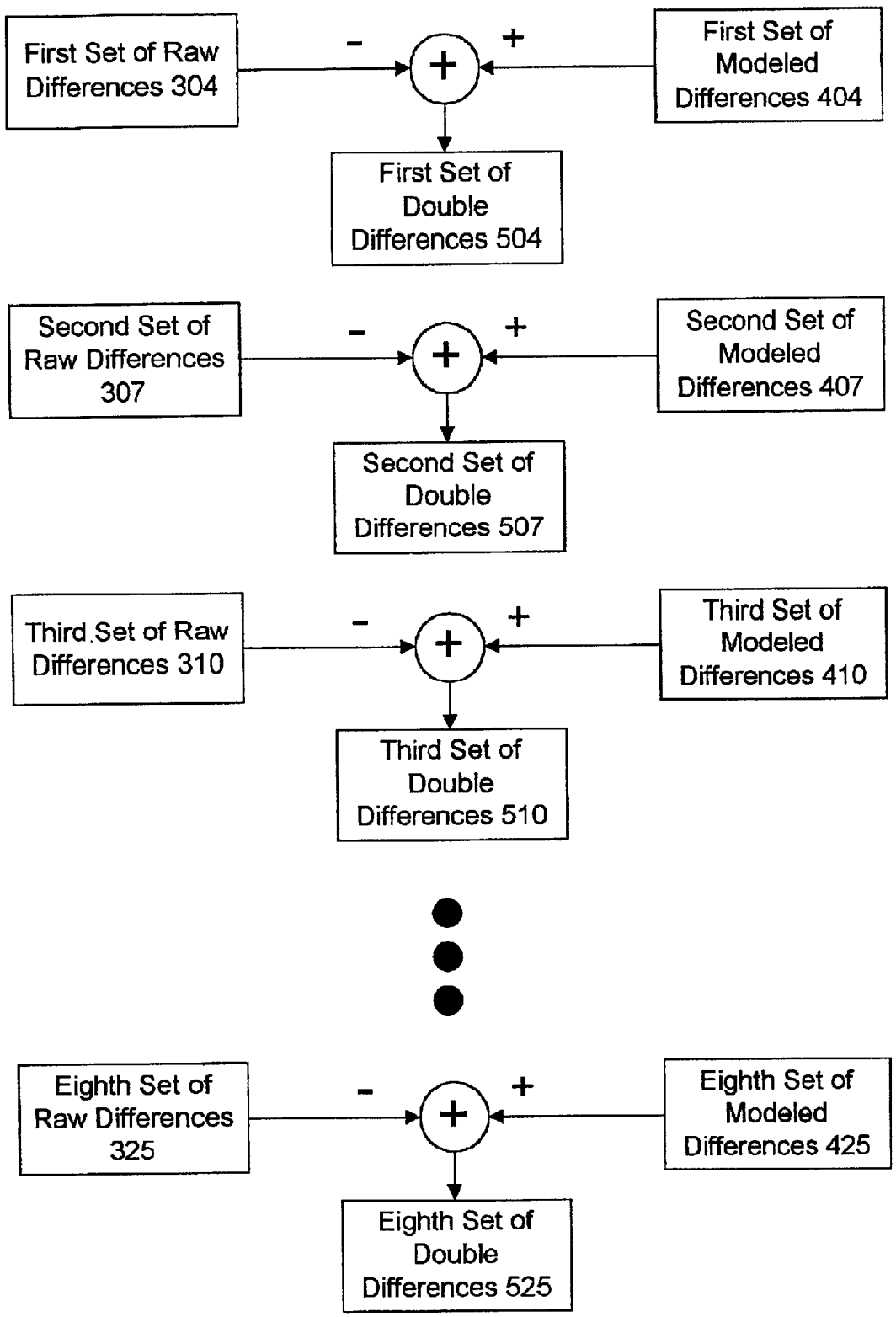
FIG. 5            500

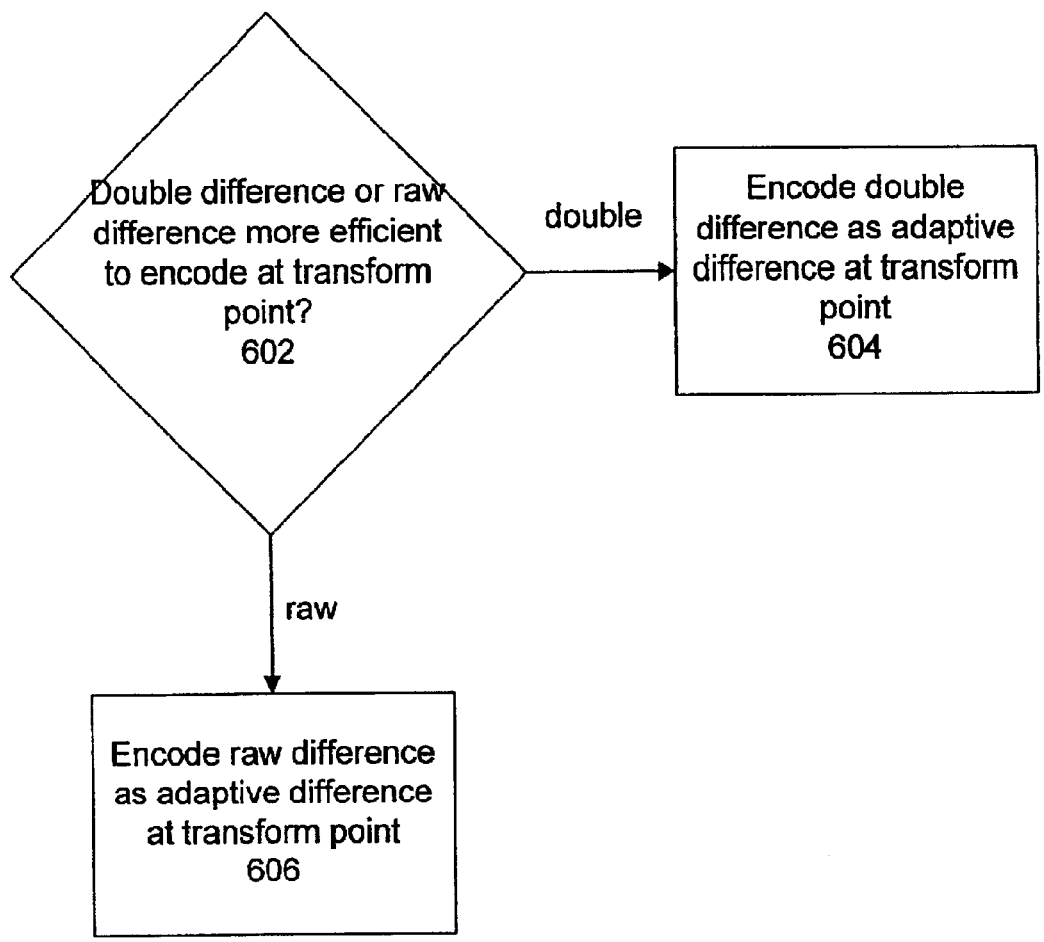
FIG. 6      600

FIG. 8    800

Encoding Process

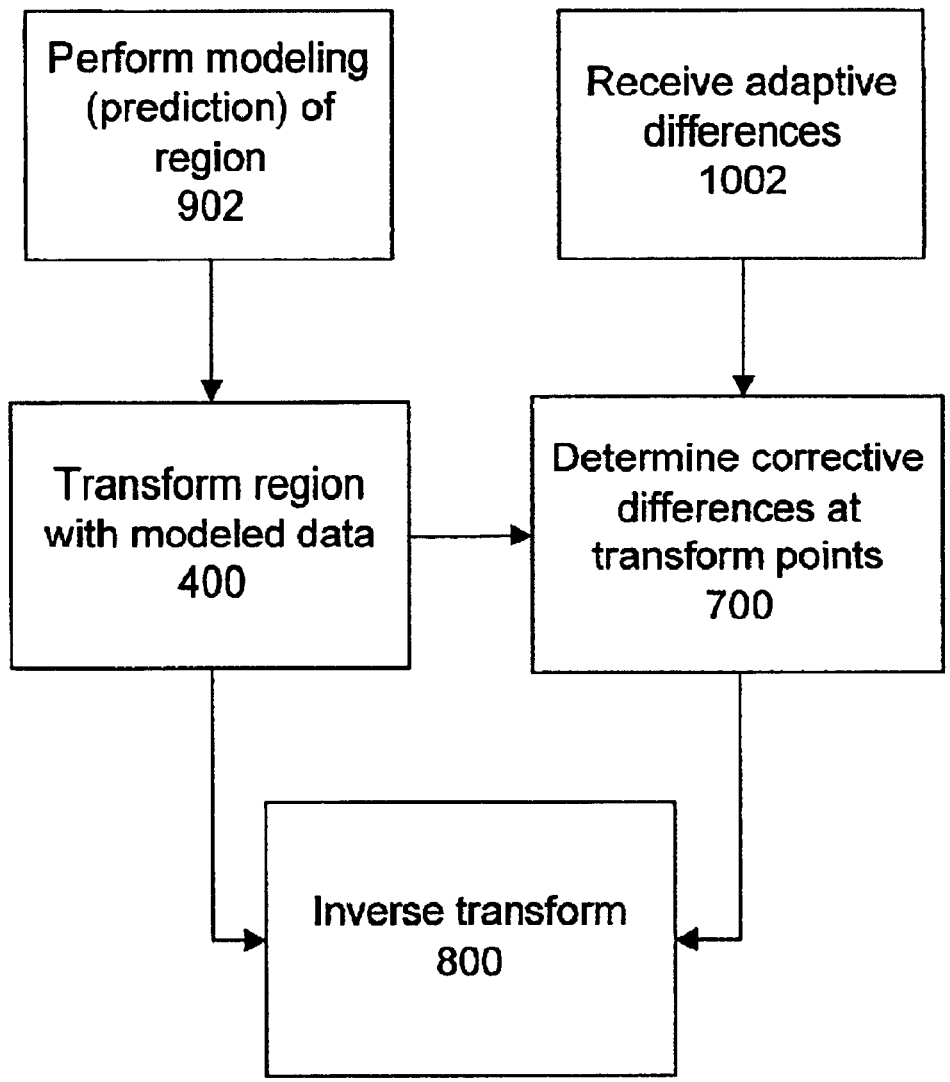
Decoding Process
FIG. 10          1000

EFFICIENTLY ADAPTIVE DOUBLE PYRAMIDAL CODING

CROSS-REFERENCES TO RELATED APPLICATIONS

This patent application claims priority from U.S. Provisional Patent Application No. 60/257,845, filed Dec. 20, 2000 and entitled "Double Pyramid," the disclosure of which is hereby incorporated by reference. This patent application is related to commonly-owned and co-pending U.S. patent application Ser. No. 10/032,394 filed Dec. 19, 2001 and entitled "Adaptive Transforms," inventors Adityo Prakash, Edward Ratner, and Dmitri Antsos, the disclosure of which is hereby incorporated by reference.

BACKGROUND OF THE INVENTION

1. Field of the Invention

The present invention relates in general to communications. More particularly, the invention relates to the transmission of multidimensional signals, such as video signals.

2. Description of the Background Art

Motivation

The transmission of large amounts of data across a large decentralized network, such as the Internet, is an open problem, Motion picture data, i. e., video data, presents a particularly vexing problem, as the data tends to be particularly voluminous. Compression enables the representation of large amounts of data using fewer bits, thereby increasing storage capacity and reducing transmission times. Current techniques for video transmission include MPEG and its progeny, MPEG2 and MPEG4. MPEG-type compression schemes divide the original image frame into blocks or uniform size and shape, and transmit the motion, i.e., the change in location of blocks from one frame to another. This reduces the amount of data that needs to be transmitted and/or stored.

One relevant limitation of MPEG and other compression schemes is that as blocks or objects move, new regions within the image may be uncovered. FIGS. 1A and 1B illustrate a newly uncovered (exposed) image region and are used to illustrate a problem that serves as a motivation for the present invention. FIG. 1A illustrates an image frame composed of four regions or "objects," marked 11 through 14 as illustrated. Each object may include multiple blocks under block-based compression schemes such as MPEG. (The objects in FIG. 1 are rectangular for purposes of simplicity of explanation. Actual objects need not be, and typically are not, of rectangular shape. In some schemes, the objects may be of arbitrary shape.) In FIG. 1B, objects 12 and 14 have moved apart horizontally, revealing image region 15, a previously occluded, now newly uncovered region. The color values of region 15 are wholly unknown to the decoder. MPEG and similar programs simply apply one of many still image compression techniques, such as DCT coding, to the newly uncovered regions and then transmits it to the receiving device. This conventional way of dealing with newly uncovered regions is rather inefficient.

Multiscale Transforms

Examples of multi-scale transforms are found in the field of image and video processing. There applications include spectral analysis, image de-noising, feature extraction, and, of course, image/video compression. JPEG2000, the Laplacian pyramid of Burt & Adelson [Burt and Adelson I], traditional convolution wavelet sub-band decomposition, and the lifting implementation of [Sweldens I] are all examples of multi-scale transforms. Many variations of multi-scale transforms differ in regards to how the transform coefficients are quantized and then encoded. Such variations include SPIHT by Said and Pearlman [SPIHT I], EZW (see [Shapiro I]), trellis coding (see [Marcellin I]), etc.

All multi-scale transforms operate on the principle that the efficient representation of a given multi-dimensional signal is characterized by looking at the data via a decomposition across different scales. Here a scale refers to a characteristic length scale or frequency. Coarse scales refer to smooth broad transitions in a function. The very fine scales denote the often sharp, local fluctuations that occur at or near the fundamental pixel scale of the signal.

FIG. 2A illustrates an example of different scale information for a given 1-D signal. Note that the function is actually well characterized as a smoothly varying coarse scale function f1(x) (see FIG. 2B) plus one other function depicted in FIG. 2C, f2(x). The function f2(x) contains the majority of the fine scale information. Note that f2(x) tends to oscillate or change on a very short spatial scale; whereas f1(x) changes slowly on a much longer spatial scale. The communications analogy is that of a carrier signal (i.e. coarse scale modulating signal) and the associated transmission band (i.e. high frequency or fine scale signal). In fact by referring to FIGS. 2A–C one can see that the complete high frequency details are well characterized by f2(x) and the low frequency or average properties of the signal are exhibited by f1(x). In fact few signals are as cleanly characterized into specific scales as the function depicted in FIG. 2A.

FIGS. 2D–G show a similar process in 2-dimensions (2-D). The original pixel data, or finest scale, is denoted in FIG. 2D. Here the averaging filter at each scale is depicted in FIG. 2E as well as an example sub-sampling rule. In this case the sub-sampling rule is referred to as a quincunx lattice in 2-dimensions and once again preserves half the points at each step. FIGS. 2F and G show successive steps in building the multi-resolution pyramid for a square domain via application of the filter and sub-sampling logic depicted in FIG. 2E. At each step of the process the numbers at each pixel refer to the functional value of the pyramid at a given scale. Note that the scale depicted in FIG. 2G contains almost one quarter of the sample points in the original 2-D function shown in FIG. 2D because each application of the quincunx sub-sampling reduces the number of points by a factor of two. Other samplings are also known in the art.

In order to handle boundary effects for the convolution at the edge of the pictured rectangular domain, it may be assumed, for example, that the data at each scale can be extended via a mirror symmetric extension appropriate to the dimensionality of the signal across the boundary in question.

Pyramidal Transform

FIG. 2H depicts a conventional forward pyramidal transform 200. The transform 200 typically operates on an image 202. The pyramidal transform 200 illustrated in FIG. 2H includes three levels (layers) of transformation.

In the first level of transformation, a low pass reduction 204 and a high pass reduction 206 are performed on the image 202. The low pass reduction 204 comprises filtering the color values of the image array through a low pass filter, then reducing by down sampling. For example, if the down sampling is by a factor of two, then every other pixel is effectively removed by the reduction. The result of such a low pass reduction is a coarser version of the image. If the down sampling is by a factor of two, then the low pass reduction 204 outputs a coarse subimage (not shown) with half the number of pixels as in the image 202. Similarly, the high pass reduction 206 comprises filtering the color values of the image array through a high pass filter, then reducing by down sampling. The result of such a high pass reduction is difference subimage 208. The difference subimage 208 also has a fraction of the number of pixels as in the image 202. A difference subimage may be called an error subimage. As described later, difference subimages may be recombined with coarse subimages to reconstruct the image.

The second and third levels are similar to the first level. In the second level, a low pass reduction 210 and a high pass reduction 212 are performed on the coarse subimage output by the first level's low pass reduction 204. In the third level, a low pass reduction 216 and a high pass reduction 218 are performed on the coarse subimage output by the second level's low pass reduction 210. The result of the pyramidal transform 200 is a final coarse subimage 222 output by the third level's low pass reduction and three difference subimages 208, 214, and 220 (one for each level).

FIG. 2I depicts a conventional reverse (or inverse) pyramidal transformation 250. The inverse transform 250 operates on the coarse subimage 222 output by the forward transform 200. Like the forward transform 200 in FIG. 2H, the reverse transform 250 in FIG. 2I includes three levels.

In the first level, an expansion low pass 252 is performed on the coarse subimage 222. The expansion low pass 252 comprises expanding by upsampling, then filtering through a low pass filter. For example, if the up sampling is by a factor of two, then a zero pixel is effectively inserted between every two pixels. Also in the first level, expansion high pass 254 is performed on the last (in this case, the third) difference subimage 220 from the forward transform 200. The expansion high pass 254 comprises expanding by upsampling, then filtering through a high pass filter. The outputs of the expansion low pass 252 and of the expansion high pass 254 are then added together. The result is a less coarse subimage (not shown). For example, if the upsampling is by a factor of two, then the less coarse subimage should have twice the number of pixels as the coarse subimage 222.

The second and third levels are similar to the first level. In the second level, an expansion low pass 256 is performed on the less coarse subimage output by the first level's expansion low pass 252. In addition, an expansion high pass 258 is performed on the second difference subimage 214 from the forward transform 200. The outputs of the expansion low pass 256 and of the expansion high pass 258 are then added together. The result is another less coarse subimage (not shown). In the third level, an expansion low pass 260 is performed on the less coarse subimage output by the second level's expansion low pass 256. In addition, an expansion high pass 262 is performed on the first difference subimage 208 from the forward transform 200. The outputs of the expansion low pass 260 and of the expansion high pass 262 are then added together. The result is a reconstruction of the image 202. Note that the conventional transform and inverse transform as described above is lossless in that the reconstructed image 202 in FIG. 2I is the same as the original image 202 in FIG. 2H.

SUMMARY

In accordance with an embodiment of the invention, a method of encoding includes generating for each transform point a double difference coefficient (comprising the difference between a modeled difference coefficient and a raw difference coefficient) and encoding as an adaptive difference coefficient for each transform point either the double difference coefficient or the raw difference coefficient. Whether the double difference coefficient or the raw difference coefficient is selected to be the adaptive difference coefficient depends on which one provides more efficient coding.

In accordance with an embodiment of the invention, a method of decoding includes receiving the adaptive difference coefficients from the encoder, applying the same modeling and transform as the encoder to generate the modeled difference coefficients, generating corrective difference coefficients (from the adaptive difference coefficients and the modeled coefficients), and inverse transformation using the corrective difference coefficients.

In accordance with an embodiment of the invention, a system may include an encoder implementing the method of encoding and a decoder implementing the method of decoding.

BRIEF DESCRIPTION OF THE DRAWINGS

FIGS. 2D–2G illustrate multiscale transforms in two dimensions.

FIG. 3 depicts a forward transform of an image region with raw data in accordance with an embodiment of the invention.

FIG. 4 depicts a forward transform of an image region with modeled data in accordance with an embodiment of the invention.

FIG. 5 depicts generation of double difference coefficients in accordance with an embodiment of the invention.

FIG. 6 is a flow chart depicting encoding of adaptive difference coefficients in accordance with an embodiment of the invention.

FIG. 10 is a flow chart depicting a decoding process in accordance with an embodiment of the invention.

DESCRIPTION OF THE SPECIFIC EMBODIMENTS

Figure 1A:
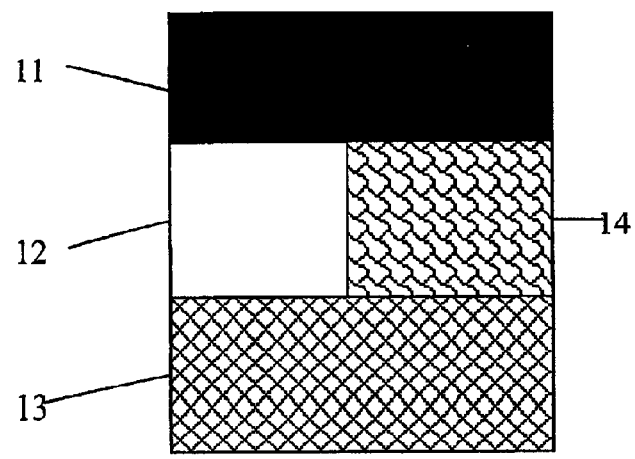
FIGS. 1A and 1B illustrate a newly uncovered (exposed) image region.

FIG. 3 depicts a forward transform of an image region with raw data in accordance with an embodiment of the invention. The transform 300 may operate on a region of an image. For example, the region may comprise an image block or an image segment.

The specific forward transform 300 in FIG. 3 includes eight levels of transformation. If the down sampling in each level is by a factor of two, then having eight levels results in a reduction in pixels by a factor of 256 ($2^8$). Square regions of 256 (16×16) pixels or less may be reduced to a single average pixel by such an eight-level transform 300. In one specific embodiment, the regions are such that they generally fit within such a 16×16 block, so that the result of the eight-level transform 300 is a single average pixel. However, transforms with other numbers of levels of transformation are also contemplated to be within the scope of this invention. For example, a four-level transform may reduce regions that fit within an 4×4 square into a single average pixel, a six-level transform may reduce regions that fit within an 8×8 square into a single average pixel, a ten-level transform may reduce regions that fit within an 32×32 square into a single average pixel, a twelve-level transform may reduce regions that fit within an 64×64 square into a single average pixel, a fourteen-level transform may reduce regions that fit within an 128×128 square into a single average pixel, a sixteen-level transform may reduce regions that fit within an 256×256 square into a single average pixel, and so on.

In the first level of transformation, a low pass reduction 302 and a high pass reduction 303 are performed on the image region with raw data 301. The low pass reduction 302 comprises filtering the raw color values of the image region 301 through a low pass filter, then reducing by down sampling. For example, if the down sampling is by a factor of two, then every other pixel is effectively removed by the reduction. The result of such a low pass reduction is a coarser version of the raw image region. If the down sampling is by a factor of two, then the low pass reduction 302 outputs a coarse raw subregion (not shown) with half the number of pixels as in the raw region 301. Similarly, the high pass reduction 303 comprises filtering the raw region 301 through a high pass filter, then reducing by down sampling. The result of such a high pass reduction is a first set of raw differences (i.e. a raw difference subregion) 304. The raw difference subregion 304 also has a fraction of the number of pixels as in the image region 301.

The second through eighth levels are similar to the first level. In the each level, a low pass reduction 305, 308, . . . , 323 and a high pass reduction 306, 309, . . . , 324 are performed on the coarse raw subregion output by the prior level's low pass reduction. If the image region 301 is small enough (i.e. fits within a 16×16 block for an 8-level transform), then the final coarse raw subregion 326 output by the last level's low pass reduction should comprise a single pixel that represents the average pixel of the raw region 301. In such instances, the result of the forward transform 300 is the average raw pixel of the region 326 and eight raw difference subregions 304, 307, 310, . . . , 325 (one for each level). If the image region 301 is small enough such that it can be processed by less than the eight levels, then the processing may end before the last levels. For example, if the image region 301 fits within a 8×8 block, only six levels are needed for processing.

FIG. 4 depicts a forward transform of an image region with modeled data in accordance with an embodiment of the invention. The forward transform 400 of FIG. 4 transforms the region with modeled data 401 in the same way that the forward transform 300 of FIG. 3 transforms the region with raw data 301. The result of the forward transform 400 of FIG. 4 is the average modeled pixel of the region 426 and eight modeled difference subregions 404, 407, 410, . . . , 425 (one for each level).

FIG. 5 depicts generation of double difference coefficients in accordance with an embodiment of the invention. As shown in FIG. 5, the double difference coefficients are generated by taking the modeled difference coefficients and subtracting the raw difference coefficients. This is done per transform point. The generation process 500 depicted in FIG. 5 results in eight sets of double difference coefficients 504, 507, 510, . . . , 525. The first set of double difference coefficients 504 is generated by subtracting (on a point by point basis) the first set of raw difference coefficients 304 from the first set of modeled difference coefficients 404. And so on to generate the other seven sets of double difference coefficients 507, 510, . . . , 525.

FIG. 6 is a flow chart depicting encoding of adaptive difference coefficients in accordance with an embodiment of the invention. This process 600 is generally performed in an encoder. The specific process 600 depicted encodes a single adaptive difference coefficient. Hence, the process 600 is to be applied to each transform point to encode all the adaptive difference coefficients. According to the process 600, a determination is made as to whether the double difference coefficient or the raw difference coefficient is more efficient to encode (step 602). If the double difference coefficient is more efficient to encode, then the double difference coefficient is encoded as the adaptive difference coefficient for the transform point (step 604). On the other hand, if the raw difference coefficient is more efficient to encode, then the raw difference coefficient is encoded as the adaptive difference coefficient for the transform point (step 606).

Generally, the smaller the coefficient, the more efficient it is to encode. If the modeled data is close to the raw data for the relevant pixel area, then the double difference coefficient would tend to be relatively small and efficient to encode. However, if the modeled data is quite different from the raw data for the relevant pixel area, then the double difference coefficient would tend to be relatively large and inefficient to encode. In that case, the raw difference coefficient may be smaller and more efficient to encode.

Figure 7:
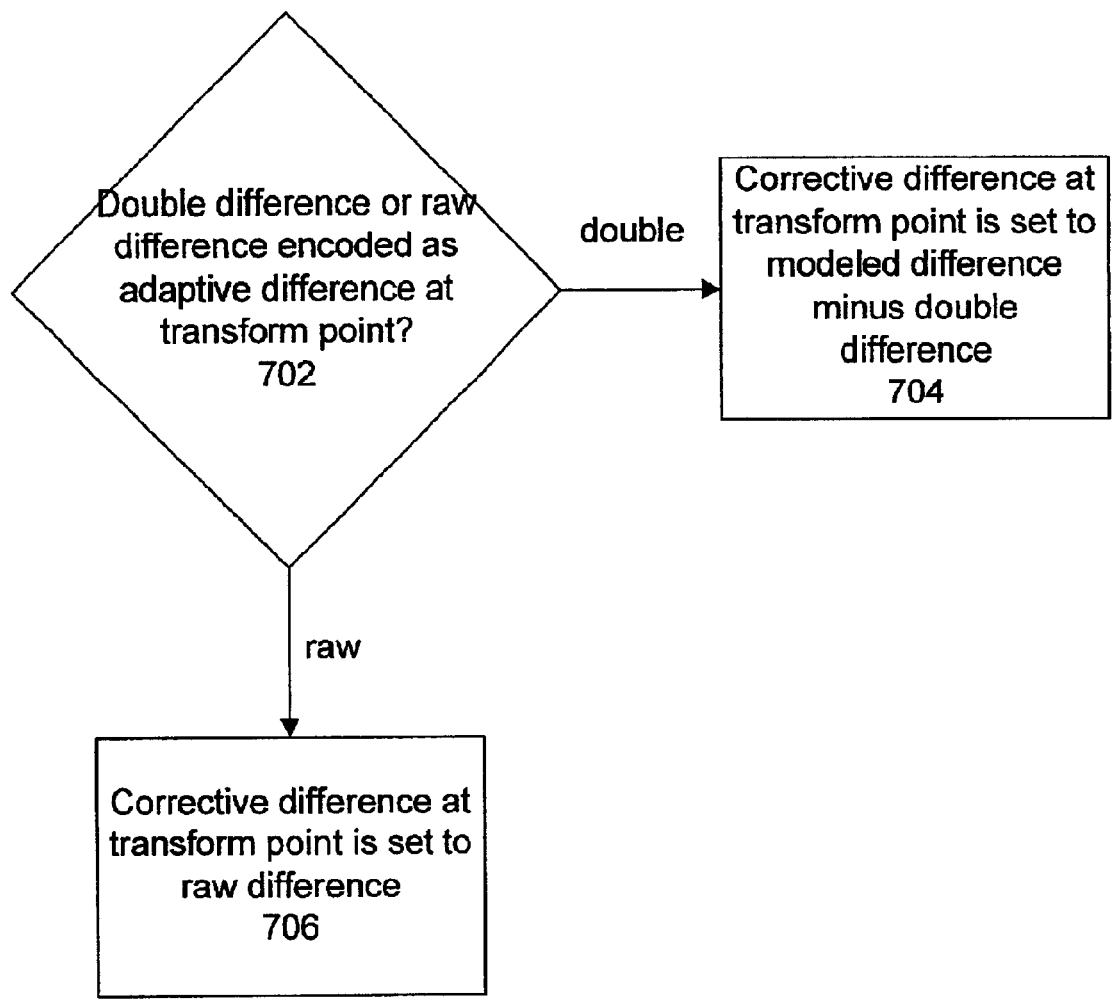
FIG. 7 is a flow chart depicting determination of corrective difference coefficients in accordance with an embodiment of the invention.

FIG. 7 is a flow chart depicting determination of corrective difference coefficients in accordance with an embodiment of the invention. This process 700 is generally performed in a decoder. The corrective difference coefficient at each point depends on the type of adaptive difference coefficient encoded at that point (step 702). If the adaptive difference coefficient at a transform point is a double difference coefficient, then the corrective difference coefficient is set to be the modeled difference coefficient for that point minus the double difference coefficient for that point (step 704). On the other hand, if the adaptive difference coefficient at a transform point is a raw difference coefficient, then the corrective difference coefficient is simply set to be the raw difference coefficient for that point (step 706). In accordance with one embodiment, one flag per transform point (with entropy coding we would expect much higher coding efficiency than 1 bit point) may be transmitted by the encoder to indicate whether the adaptive difference coefficient is the double difference coefficient or the raw difference coefficient. Alternatively, the decoder may possibly be able to determine deductively which one it is.

Figure 8:
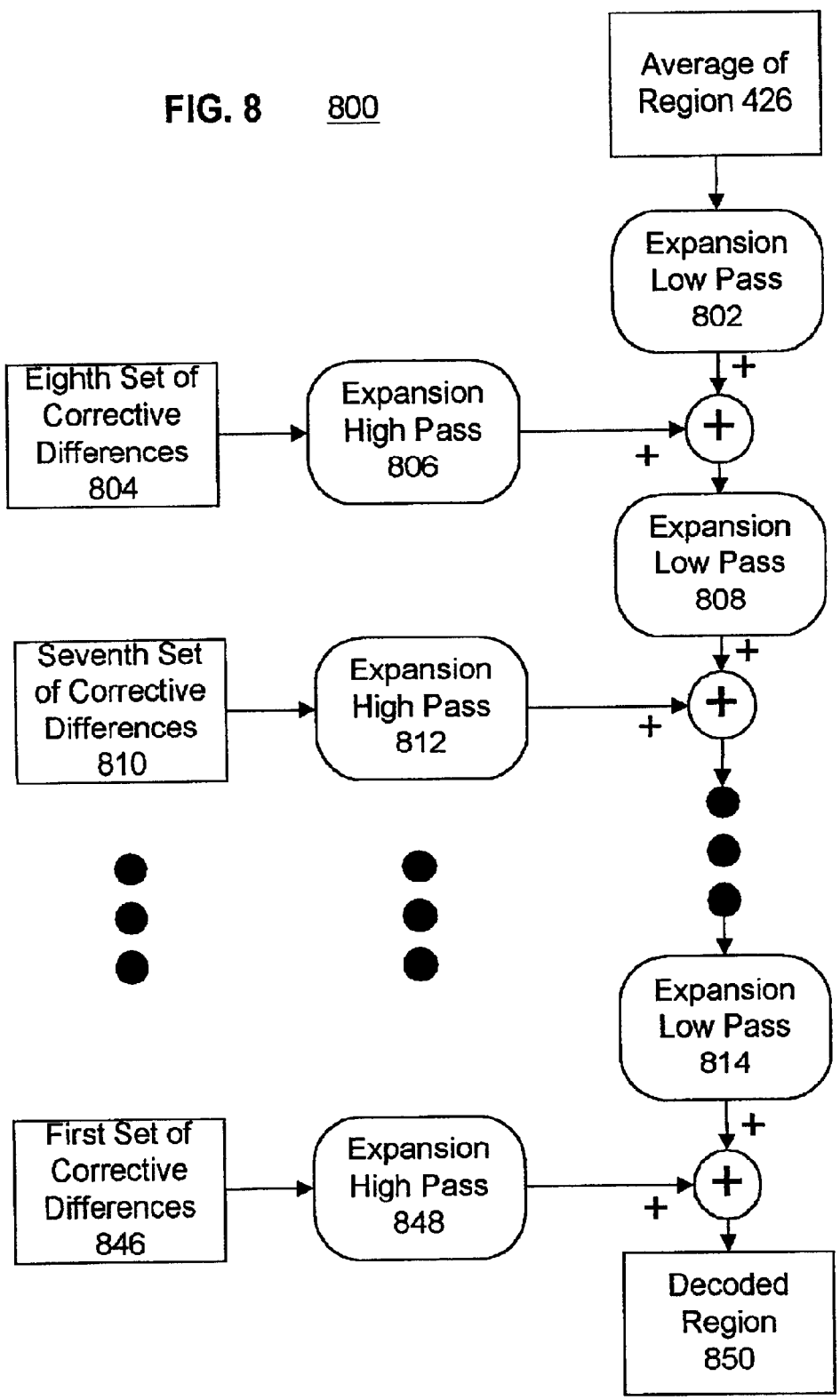
FIG. 8 depicts a reverse transform to decode an image region in accordance with an embodiment of the invention.

FIG. 8 depicts a reverse transform to decode an image region in accordance with an embodiment of the invention. The reverse transform 800 may begin its operates on the average modeled pixel (or perhaps very coarse subregion) 426 output by the forward transform 400. Like the forward transform 400 in FIG. 4, the reverse transform 800 of FIG. 8 includes eight levels. In other words, the same number of levels are used in the reverse transform as were used in the forward transform.

In the first level, an expansion low pass 802 is performed on the average modeled pixel (or perhaps very coarse subregion) 426. The expansion low pass 802 comprises expanding by upsampling, then filtering through a low pass filter. For example, if the up sampling is by a factor of two, then a zero pixel is effectively inserted between every two pixels. Also in the first level, expansion high pass 806 is performed on the last (in this case, the eighth) set of corrective difference coefficients 804. The expansion high pass 806 comprises expanding by upsampling, then filtering through a high pass filter. The outputs of the expansion low pass 802 and of the expansion high pass 806 are then added together. The result is a less coarse subregion (not shown). For example, if the upsampling is by a factor of two, then the less coarse subregion should have twice the number of pixels as that input into the first level.

The second and third levels are similar to the first level. In the second level, an expansion low pass 808 is performed on the less coarse subregion output by the first level's expansion low pass 802. In addition, an expansion high pass 812 is performed on the second set of corrective differences 810. The outputs of the expansion low pass 808 and of the expansion high pass 812 are then added together. The result is another less coarse subimage (not shown). And so on for the third through eighth levels. The result of the decoding process 800 is a decoded image region 850 that should be a good approximation to the raw image region 301.

Figure 1B:
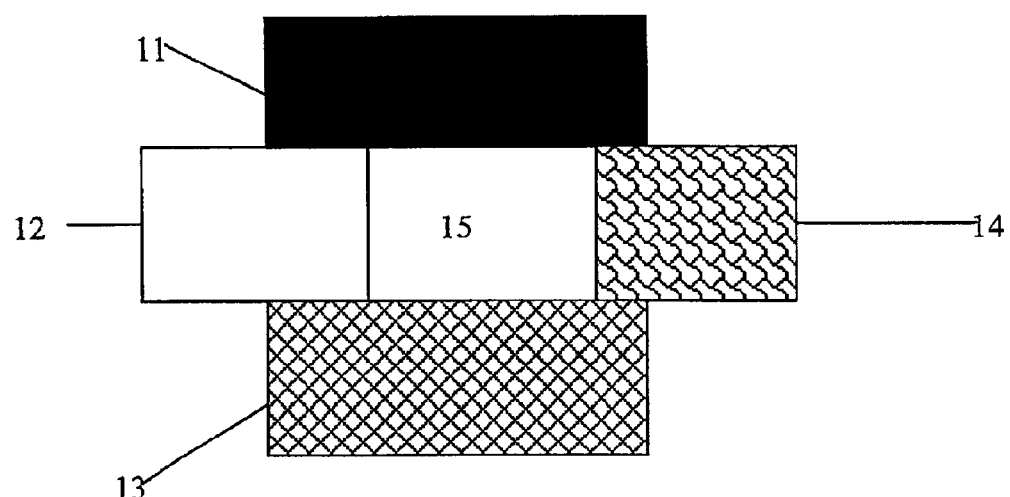
Figure 2A:
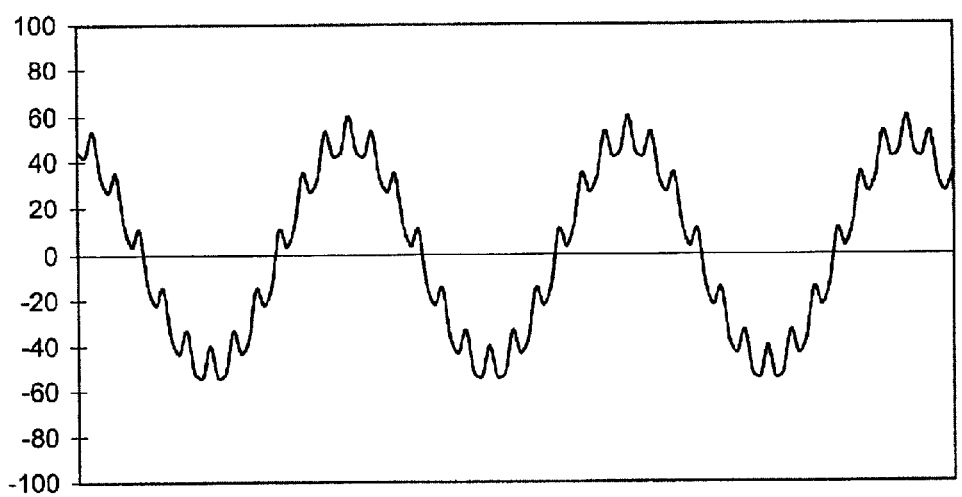
FIGS. 2A–C illustrate a multiscale transform in one dimension.
Figure 2B:
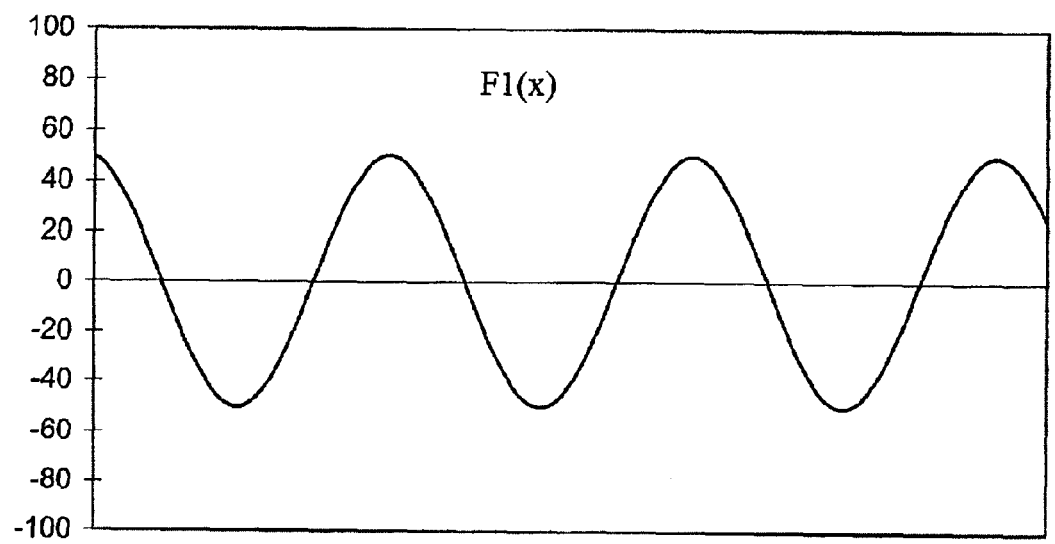
Figure 2C:
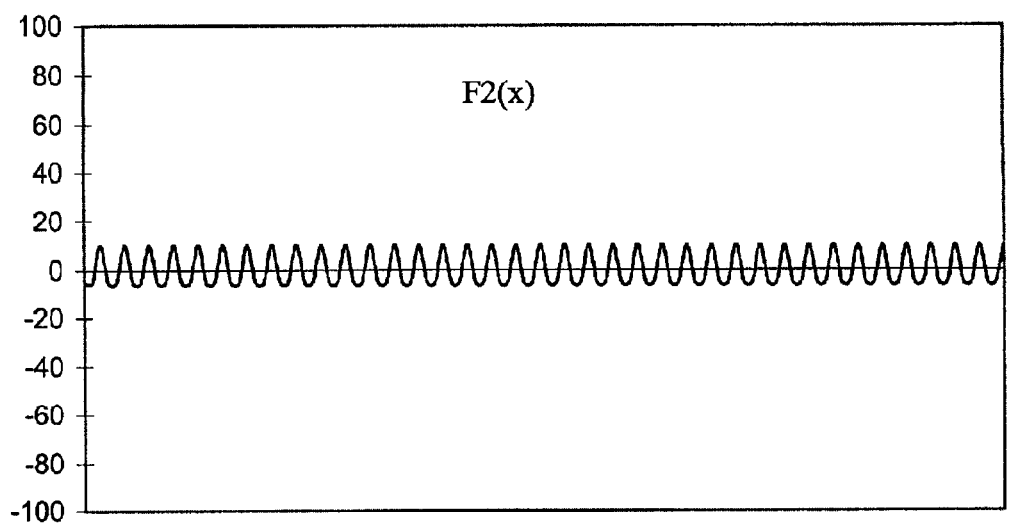
Figure 2D:
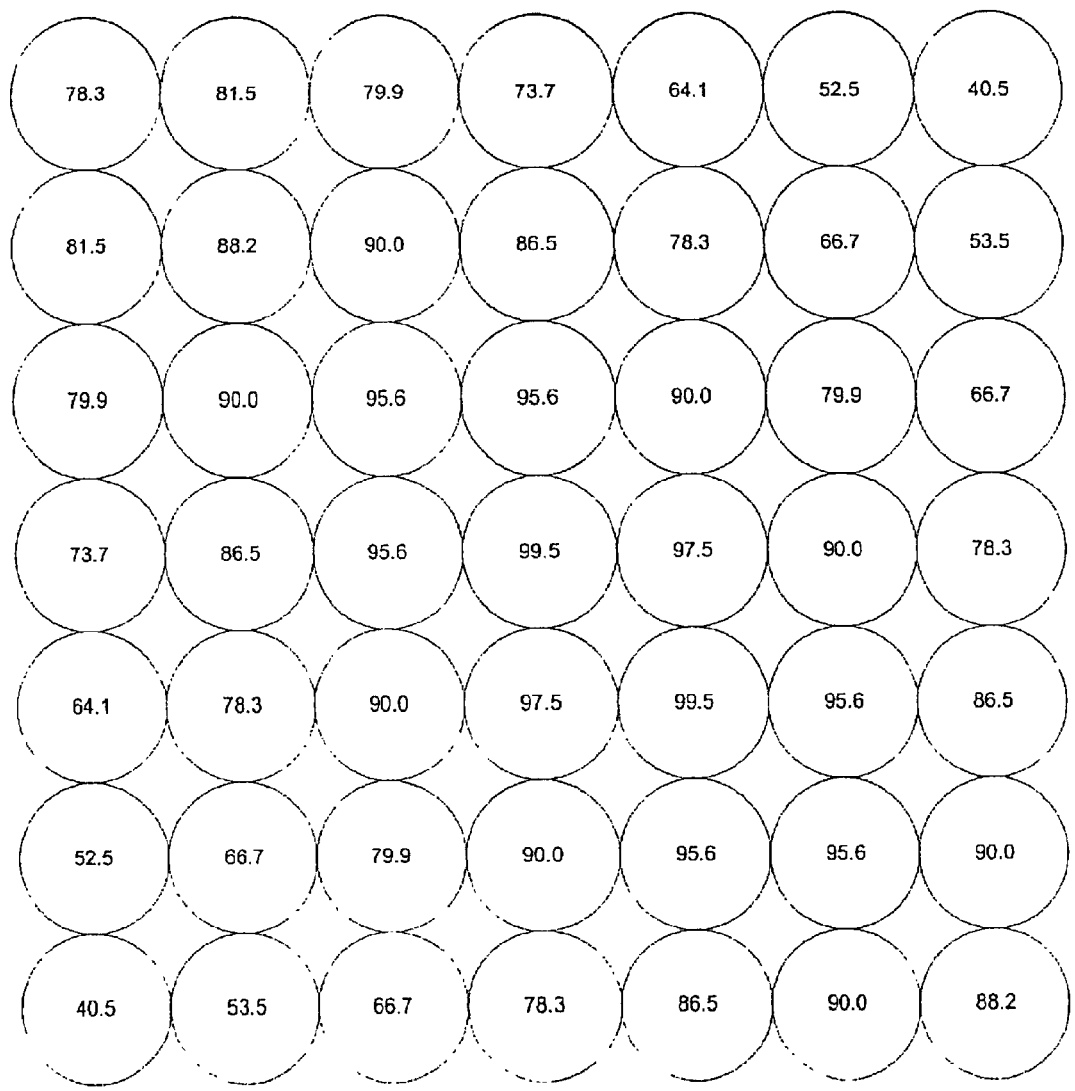
Figure 2F:
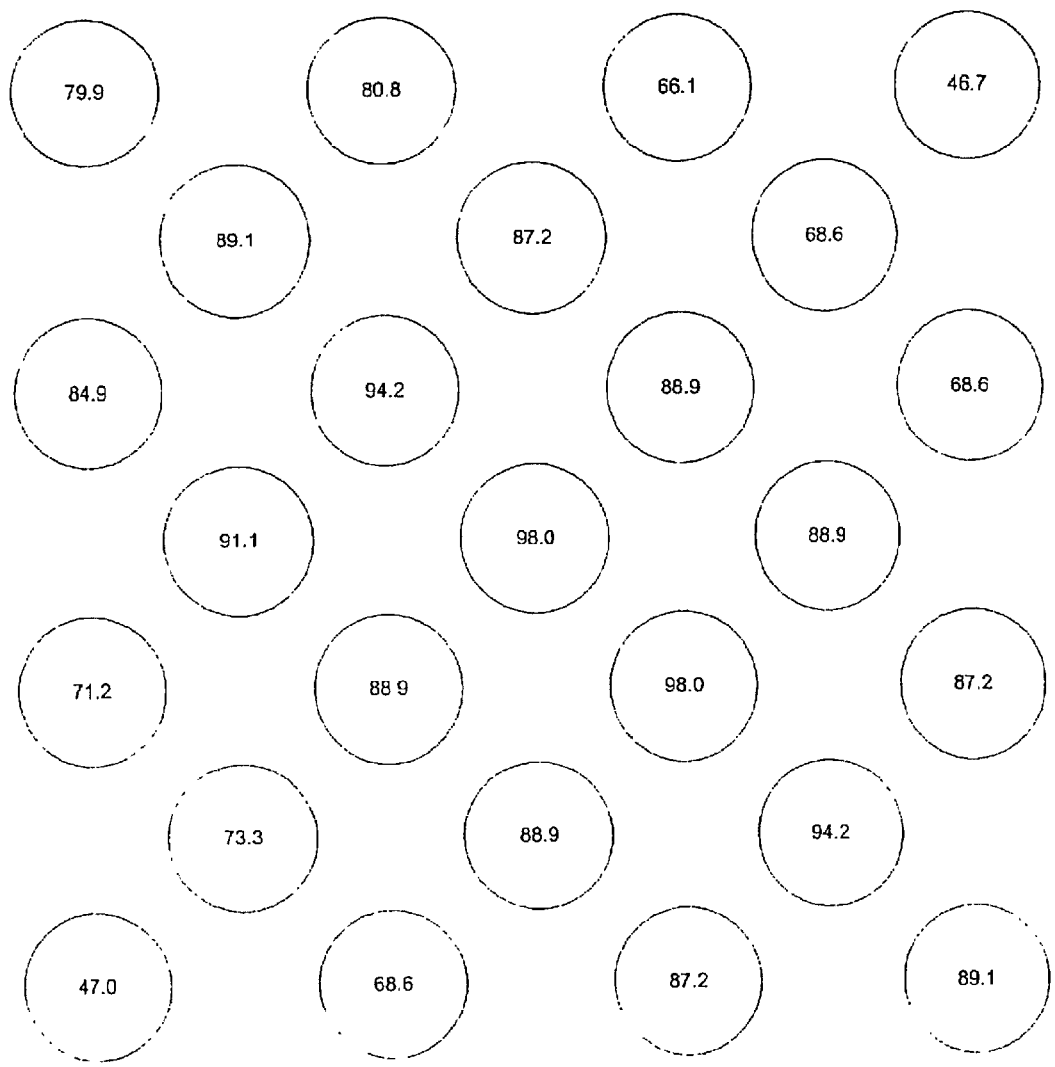
Figure 2H:
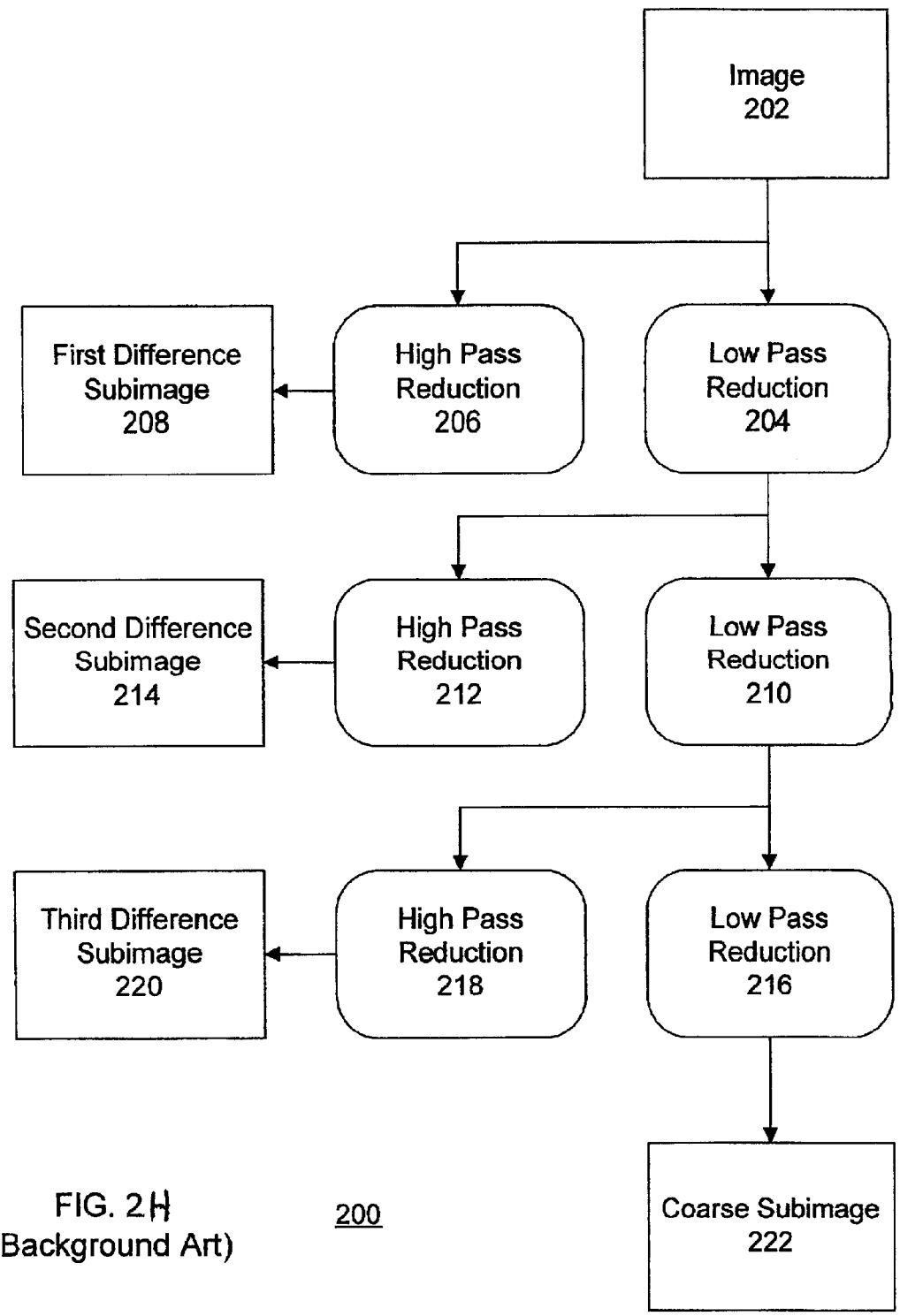
FIG. 2H depicts a conventional forward pyramidal transform.
Figure 2I:
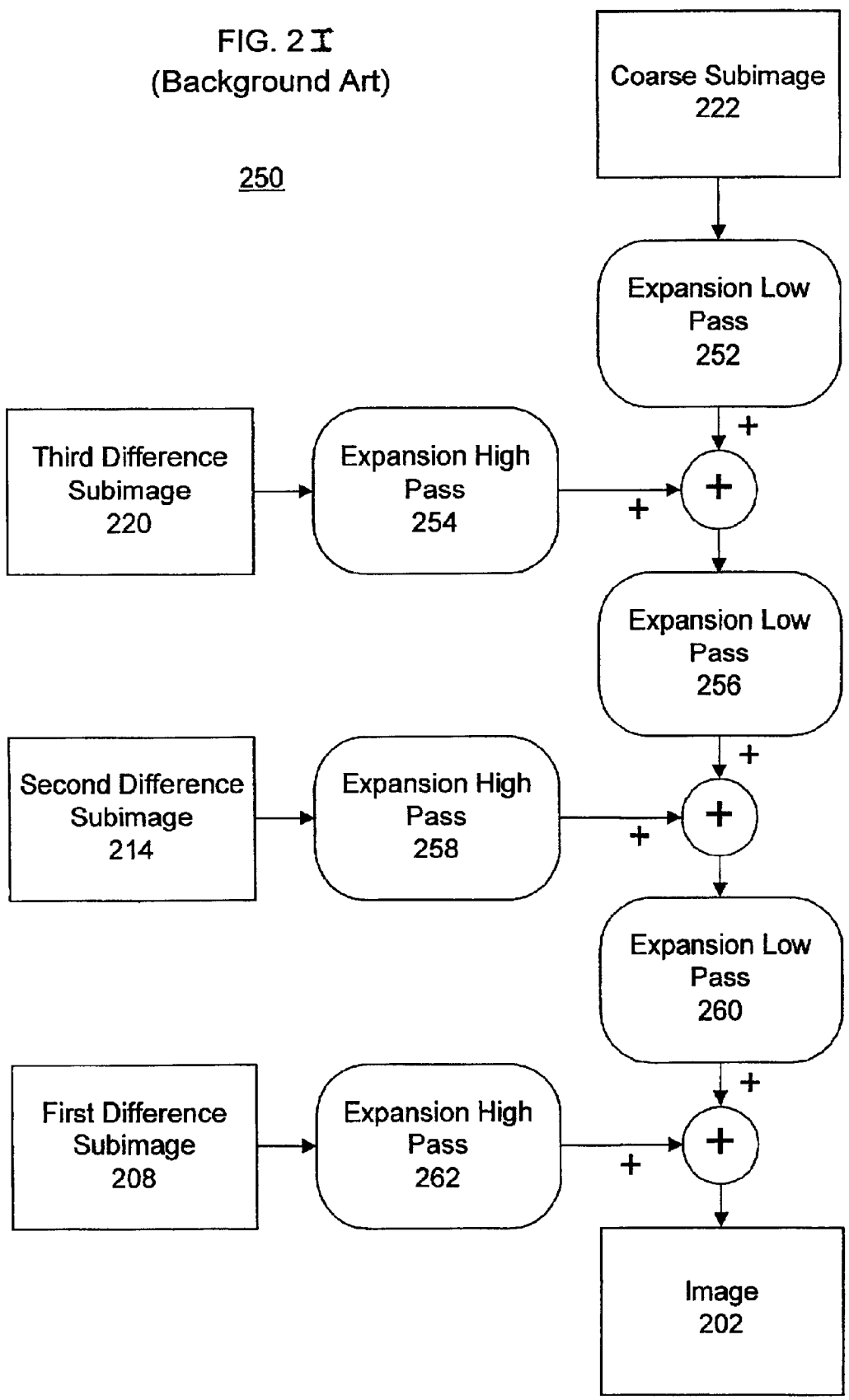
FIG. 2I depicts a conventional reverse pyramidal transformation.
Figure 9:
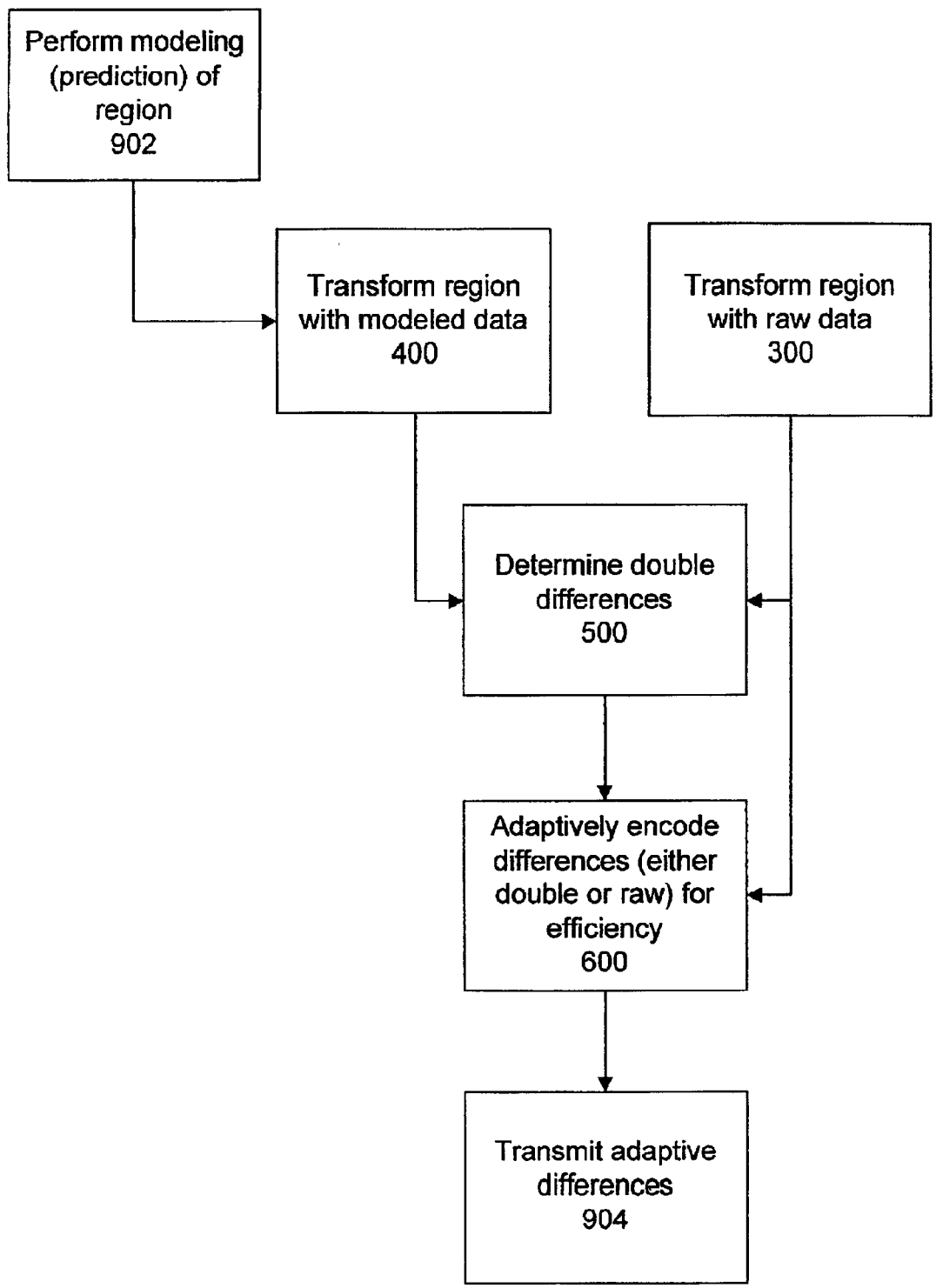
FIG. 9 is a flow chart depicting an encoding process in accordance with an embodiment of the invention.

FIG. 9 is a flow chart depicting an encoding process in accordance with an embodiment of the invention. This process 900 is generally performed in an encoder. The process 900 includes a step 902 where modeling (prediction) is performed for the image region at issue. Any of various types of modeling may be used. For purposes of illustration, if the region at issue is a newly uncovered (exposed) region such as region 15 in FIG. 1, then that region 15 may be modeled by selecting one of the surrounding segments 11–14 and extending the pixel values from the selected segment into the region 15. For example, neighboring segment 12 may be selected and extrapolated to model the pixel data of region 15. That is merely an example of one type of modeling that may be used. Various other types of modeling (prediction) may be used within the scope of the invention.

Once the region is modeled 902, the modeled image region 401 is transformed 400 in accordance with the forward transform 400 described in relation to FIG. 4. In addition, the raw image region 301 is transformed in accordance with the forward transform 300 described in relation to FIG. 3. Note that the encoder is able to the latter forward transform 300 because it has the raw data of the image region. In contrast, the decoder does not have the raw data.

Next, the double difference coefficients are determined 500 in accordance with FIG. 5. This step 500 requires use of the outputs of both the forward transforms 300 and 400. Using the double difference coefficients and the raw difference coefficients, an adaptive encoding 600 is performed in accordance with FIG. 6. The adaptive encoding selects at each transform point either the double difference coefficient or the raw difference coefficient. The more efficient of the two coefficients is the one selected to be encoded as the adaptive difference coefficient for that transform point. Finally, the adaptive difference coefficients are transmitted 904 by the encoder to the decoder.

FIG. 10 is a flow chart depicting a decoding process in accordance with an embodiment of the invention. The process 1000 is generally performed in a decoder. The process 1000 includes a step 902 where modeling (prediction) is performed for the image region at issue. The modeling 902 performed in the decoding process 1000 is the same modeling 1002 performed by the encoding process 900. This feature is utilized by the present invention to decrease the bandwidth needed to transmit an encoded image region. Because the decoder does the modeling 902, it does not need to receive the modeled difference coefficients. However, it does receive the adaptive difference coefficients transmitted by the encoder (step 904).

The modeled data of the region are forward transformed 400 in accordance with FIG. 4. The forward transform 400 used by the decoder is the same as the one used by the encoder. Using the modeled difference coefficients from the transform 400 and the adaptive difference coefficients from the encoder, the decoder determines the corrective difference coefficients in accordance with FIG. 7. Finally, using the corrective difference coefficients (and the average modeled pixel), the decoder performs an inverse transform in accordance with FIG. 8. The result of which is the decoded image region 850 that should be a good approximation to the raw image region 301.

Note that embodiments of the present invention may be applied to block-based compression schemes, such as MPEG-like schemes, and also to segment-based compression schemes, such as that described in the above-referenced "Segmentation" and "Video Processing" applications.

For example, referring back to FIG. 1B, in many real-life situations, the color of region 15 is related to the color values of one (or possible more than one) of the surrounding segments. Therefore using the surrounding segments, a smart decoder may predict (i.e. model) the likely color values of the region 15. (As used herein, an image segment may be equivalent to an image region.) The above description provides an architecture for an exemplary encoder/decoder system that efficiently transmits information sufficient for the (smart) decoder to decode with reasonable accuracy the color values of such newly uncovered (exposed) image regions. The encoder and decoder are synchronized in that the encoder and decoder use the same prediction (modeling) algorithms so that only correction-related information needs to be sent to the decoder. Referring back to FIG. 1B, the encoder and decoder, knowing the surrounding regions 11–14, will make identical predictions as to the color values of the newly exposed image region 15. The encoder will then only need to transmit the correction-related information to the decoder. This method is efficient because the correction-related information is typically relatively small or may be made to be small by the above-described adaptive double pyramidal coding.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for encoding an image region using a transform, the method comprising:

generating for each transform point a double difference coefficient, wherein the double difference coefficient comprises a difference between a raw difference coefficient and a modeled difference coefficient; and encoding as an adaptive difference coefficient for each transform point either the double difference coefficient or the raw difference coefficient, wherein whether the double difference coefficient or the raw difference coefficient is selected to be the adaptive difference coefficient depends on which one provides more efficient coding.

2. The method of claim 1 wherein image region comprises an exposed region of an image.

3. The method of claim 1 wherein the transform comprises a pyramidal transform.

4. The method of claim 2 wherein the pyramidal transform includes more than three levels of transformation.

5. A method for decoding an image region using a transform, the method comprising:

receiving adaptive difference coefficients from an encoder;

modeling the image region to generate a modeled region;

transforming the modeled region to generate modeled difference coefficients;

determining corrective difference coefficients using the adaptive difference coefficients and the modeled difference coefficients; and inverse transformation using the corrective difference coefficients.

6. The method of claim 5 wherein the adaptive difference coefficients comprise double difference coefficients and raw difference coefficients.

7. The method of claim 6 wherein, if the adaptive difference coefficient at a transform point is the raw coefficient, then the corrective difference coefficient at the transform point comprises the raw difference coefficient.

8. The method of claim 7 wherein, if the adaptive difference coefficient at a transform point is the double difference coefficient, then the corrective difference coefficient at the transform point comprises the modeled difference coefficient minus the double difference coefficient.

9. The method of claim 5 wherein the transform comprises a pyramidal transform.

10. The method of claim 9 wherein the pyramidal transform includes more than three levels of transformation.

11. An encoder for encoding an image region using a transform, the encoder comprising:

means for generating for each transform point a double difference coefficient, wherein the double difference coefficient comprises a difference between a raw difference coefficient and a modeled difference coefficient; and means for encoding as an adaptive difference coefficient for each transform point either the double difference coefficient or the raw difference coefficient, wherein whether the double difference coefficient or the raw difference coefficient is selected to be the adaptive difference coefficient depends on which one provides more efficient coding.

12. A decoder for decoding an image region using a transform, the decoder comprising:

means for receiving adaptive difference coefficients from an encoder;

means for modeling an image to generate a modeled region;

means for transforming the modeled region to generate modeled difference coefficients;

means for determining corrective difference coefficients using the adaptive difference coefficients and the modeled difference coefficients; and means for inverse transformation using the corrective difference coefficients.

13. A system for decoding and encoding an image region using a transform, the system comprising:

an encoder including (a) means for generating for each transform point a double difference coefficient, wherein the double difference coefficient comprises a difference between a raw difference coefficient and a modeled difference coefficient, and (b) means for encoding as an adaptive difference coefficient for each transform point either the double difference coefficient or the raw difference coefficient, wherein whether the double difference coefficient or the raw difference coefficient is selected to be the adaptive difference coefficient depends on which one provides more efficient coding; and a decoder including (a) means for receiving the adaptive difference coefficients from the encoder, (b) means for modeling the image region to generate a modeled region, (c) means for transforming the modeled region to generate modeled difference coefficients, (d) means for determining corrective difference coefficients using the adaptive difference coefficients and the modeled difference coefficients, and (e) means for inverse transformation using the corrective difference coefficients.

* * * * *